US011933217B2

(12) United States Patent
Rocco et al.

(10) Patent No.: US 11,933,217 B2
(45) Date of Patent: Mar. 19, 2024

(54) WATER CONDITION MONITORING FOR HYDROGEN STEAM INJECTED AND INTER-COOLED TURBINE ENGINE

(71) Applicant: RAYTHEON TECHNOLOGIES CORPORATION, Farmington, CT (US)

(72) Inventors: Edward Thomas Rocco, Rocky Hill, CT (US); Danbing Seto, Avon, CT (US); Coy Bruce Wood, Ellington, CT (US); Liang Tang, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/870,095

(22) Filed: Jul. 21, 2022

(65) Prior Publication Data

US 2024/0026817 A1 Jan. 25, 2024

(51) Int. Cl.
*F02C 3/30* (2006.01)
*F02C 3/20* (2006.01)
*F02C 9/00* (2006.01)
F02C 6/18 (2006.01)
F02C 7/143 (2006.01)

(52) U.S. Cl.
CPC ............... *F02C 3/305* (2013.01); *F02C 9/00* (2013.01); *F02C 3/20* (2013.01); *F02C 6/18* (2013.01); *F02C 7/1435* (2013.01)

(58) Field of Classification Search
CPC .... F02C 3/20; F02C 3/30; F02C 3/305; F02C 6/18; F02C 7/12; F02C 7/1435; F02C 7/16; F02C 9/00
See application file for complete search history.

(56) References Cited

U.S. PATENT DOCUMENTS

| | | | |
|---|---|---|---|
| 9,267,433 B2 | 2/2016 | Zhang et al. | |
| 9,464,573 B2 | 10/2016 | Remy et al. | |
| 11,603,798 B1 * | 3/2023 | Terwilliger | ............... F02C 3/22 |
| 11,635,022 B1 * | 4/2023 | Terwilliger | ............. F02C 7/141 60/775 |
| 11,808,209 B1 * | 11/2023 | Sobanski | ................ F02C 7/141 |
| 11,828,200 B2 * | 11/2023 | Terwilliger | ............. F01K 15/02 |
| 2004/0025513 A1 * | 2/2004 | Walsh | ........................ F02C 7/10 60/39.53 |
| 2005/0193714 A1 * | 9/2005 | Walsh | ...................... F02C 3/305 60/39.55 |
| 2009/0158739 A1 * | 6/2009 | Messmer | ............... F01K 21/047 60/648 |
| 2017/0341757 A1 * | 11/2017 | Weber | ..................... F25B 9/004 |

(Continued)

FOREIGN PATENT DOCUMENTS

WO 2022028651 A1 2/2022

*Primary Examiner* — William H Rodriguez
(74) *Attorney, Agent, or Firm* — Carlson, Gaskey & Olds, P.C.

(57) ABSTRACT

A propulsion system for an aircraft is disclosed and includes a water recovery system and a water monitoring system. The water recover system includes a condenser that is arranged along the core flow path and is configured to extract water from an exhaust gas flow. The water monitoring system includes a sensor and a controller programed to determine a condition of water and generate a prompt based on information communicated from the at least one sensor.

19 Claims, 3 Drawing Sheets

(56) References Cited

U.S. PATENT DOCUMENTS

| | | | |
|---|---|---|---|
| 2021/0024219 A1* | 1/2021 | Weber | F25B 9/06 |
| 2021/0277839 A1 | 9/2021 | Madden et al. | |
| 2022/0403791 A1* | 12/2022 | Iwai | F02C 9/50 |
| 2023/0120297 A1* | 4/2023 | Butler | H01M 8/04164 |
| | | | 290/52 |
| 2023/0374911 A1* | 11/2023 | Terwilliger | F01K 3/26 |
| 2023/0374938 A1* | 11/2023 | Staubach | F02C 6/20 |
| 2023/0374941 A1* | 11/2023 | Terwilliger | F02C 7/224 |

\* cited by examiner

WATER CONDITION MONITORING FOR HYDROGEN STEAM INJECTED AND INTER-COOLED TURBINE ENGINE

TECHNICAL FIELD

The present disclosure relates generally to a hydrogen powered aircraft propulsion system and, more particularly to a system and method of monitoring water condition of water utilized for intercooling and steam injection.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine Turbine engine manufacturers continue to seek further improvements to engine performance including improvements to reduce environmental impact while improving propulsive efficiencies.

SUMMARY

A propulsion system for an aircraft according to one example disclosed embodiment includes, among other possible things, a core engine that includes a core flow path where air is compressed in a compressor section, communicated to a combustor section, mixed with a hydrogen-based fuel and ignited to generate a high energy gas flow that is expanded through a turbine section. A hydrogen fuel system is configured to supply hydrogen fuel to the combustor through a fuel flow path. A water recovery system includes a condenser that is arranged along the core flow path that is configured to extract water from the high energy gas flow. A water monitoring system includes at least one sensor that is disposed downstream of the condenser and a controller that is programed to determine a condition of water and generate a prompt based on information communicated from the at least one sensor. An evaporator is in thermal communication with a core engine heat source and configured to generate a steam flow from a portion of water extracted by the condenser. The steam flow is injected into the core flow path upstream of the turbine section.

In a further embodiment of the foregoing, the propulsion system includes a water storage tank that receives water extracted by the condenser and at least one pump is in fluid communication with the water storage tank.

In a further embodiment of any of the foregoing, the at least one sensor includes a water debris monitor that is disposed downstream of the at least one pump. The water debris monitor is in communication with the controller.

In a further embodiment of any of the foregoing, the water debris monitor includes an inductive coil based debris monitor that detects magnetic field disturbances from a passing ferrous or nonferrous metal.

In a further embodiment of any of the foregoing, the at least one sensor includes a water condition monitoring sensor that is disposed downstream of the condenser. The water condition monitoring sensor is in communication with the controller.

In a further embodiment of any of the foregoing, the water condition monitoring sensor includes a conductivity monitor that detects contaminants within the water based on a change in measured conductivity.

In a further embodiment of any of the foregoing, the water condition monitoring sensor includes a chemical species sensor with real-time chemical analysis of water to assess water condition.

In a further embodiment of any of the foregoing, the propulsion system includes at least one water filter and filter monitor that is disposed downstream of the at least one pump. The at least one filter monitor is in communication with the controller.

In a further embodiment of any of the foregoing, the propulsion system includes a bypass passage for bypassing flow around the at least one filter.

In a further embodiment of any of the foregoing, the at least one water filter and the at least one filter monitor includes a common assembly within a common housing.

In a further embodiment of any of the foregoing, the at least one water filter and filter monitor includes a first water filter and filter monitor that is disposed downstream of the evaporator.

In a further embodiment of any of the foregoing, the prompt includes a maintenance prompt that prompts performance of a predefined maintenance operation.

In a further embodiment of any of the foregoing, the prompt includes an engine performance prompt that prompts a predefined engine operating procedure.

A water recovery system for an aircraft propulsion system, the water recover system, according to another example disclosed embodiment includes, among other possible things, a condenser that is configured to extract water from an exhaust gas flow. At least one sensor is disposed downstream of the condenser. A controller is programed to determine a condition of water that is extracted by the condenser and generates an alert based on information that is communicated from the at least one sensor. An evaporator is in thermal communication with a heat source and configured to generate a steam flow from a portion of water that is extracted by the condenser. The steam flow is injected into a core flow path upstream of a turbine section.

In a further embodiment of the foregoing, the alert includes a maintenance alert that prompts performance of a predefined maintenance operation.

In a further embodiment of any of the foregoing, the alert includes an engine performance alert that prompts a predefined engine operating procedure.

A method of monitoring water condition for an aircraft propulsion system, the method, according to another example disclosed embodiment includes, among other possible things, detecting a water condition with a sensor that is located downstream of a condenser that is arranged along a core flow path for extracting water from a high energy gas flow, generating a signal indicative of a condition of the extracted water with the sensor, communicating the generated signal to a controller, and generating an alert based on the information communicated from the sensor with the controller to prompt a predefined action.

In a further embodiment of the foregoing, the predefined action includes one of a predefined maintenance operation or an adjustment to operation of the aircraft propulsion system.

In a further embodiment of any of the foregoing, the sensor includes at least one of a water condition monitor sensor, a debris sensor and a filter operation monitor sensor.

In a further embodiment of any of the foregoing, the method further includes generating a steam flow from a portion of the extracted water and sensing a condition of the steam flow with a monitoring device and communicating the sensed condition to the controller.

Although the different examples have the specific components shown in the illustrations, embodiments of this invention are not limited to those particular combinations. It is possible to use some of the components or features from one of the examples in combination with features or components from another example embodiment.

These and other features disclosed herein can be best understood from the following specification and drawings, the following of which is a brief description.

DETAILED DESCRIPTION

Figure 1:
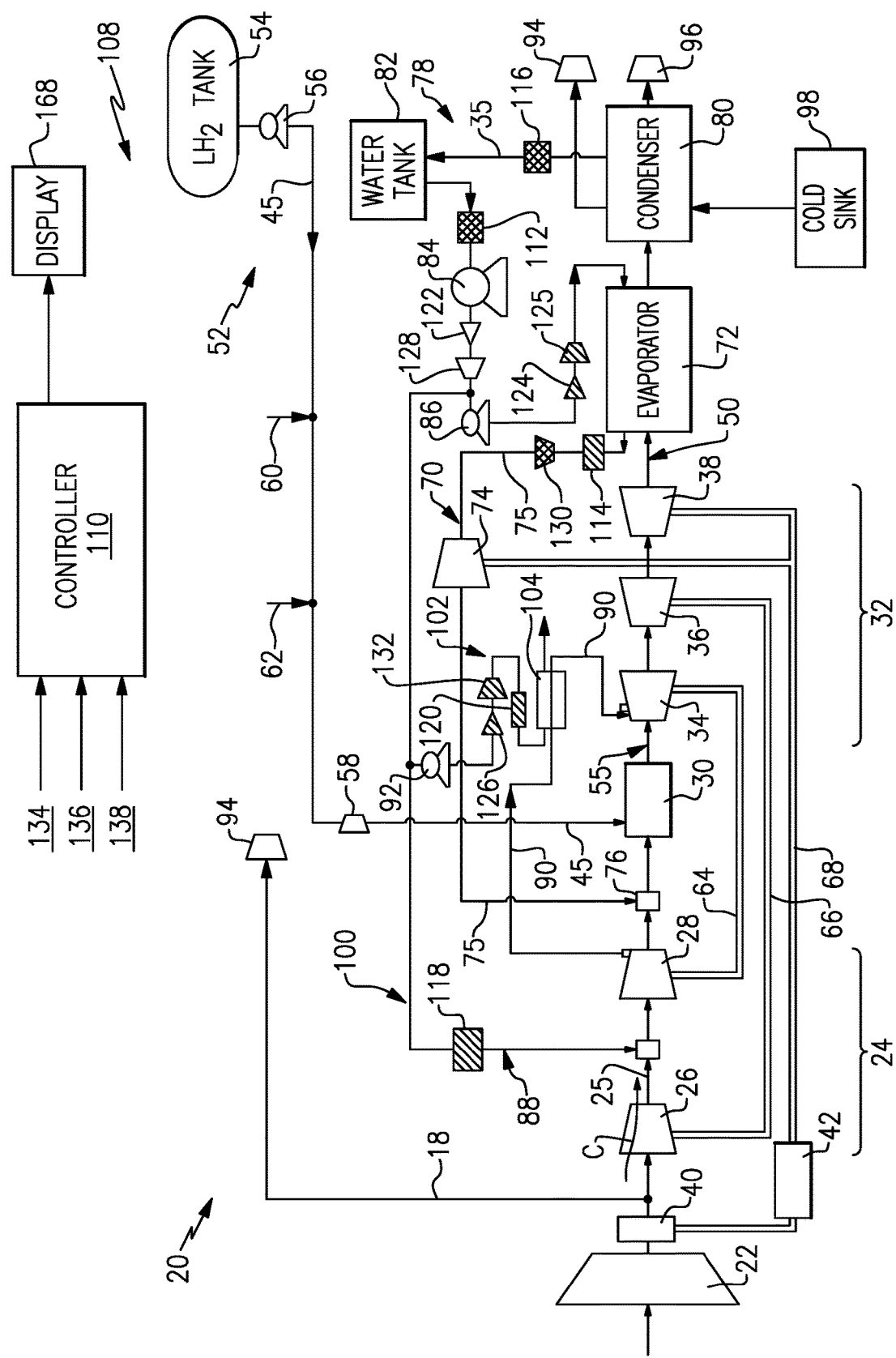
FIG. 1 is a schematic view of an example propulsion system embodiment.

FIG. 1 schematically illustrates an example aircraft propulsion system embodied in a hydrogen steam injected inter-cooled turbine engine 20. The engine 20 includes a water recovery system 78 that extracts water from an exhaust flow 50 and a water monitoring system 108 that provides information indicative of a condition of the extracted water. The condition of the water may include different measures of water purity including composition of the water, debris and/or contaminants within the water as well as any other measure useful for determining a purity of the extracted water. Water purity is monitored to assure a desired operational efficiency. Moreover, water quality and content are indicative of impurities that may be drawn in from the atmosphere and/or from devices, such as pumps and storage tanks, that may influence engine operating efficiency.

The engine 20 includes core engine with a core airflow path C through a fan 22, a compressor section 24, a combustor 30 and a turbine section 32. The fan 22 drives inlet air as a core flow 25 into the compressor section 24. In the compressor section 24, the core flow 25 is compressed and communicated to a combustor 30. In the combustor 30, the core flow 25 is mixed with a hydrogen ($H_2$) fuel flow 45 and ignited to generate a high energy gas flow 55. The high energy gas flow 55 expands through the turbine section 32 where energy is extracted and utilized to drive the fan 22 and the compressor section 24. A bypass flow, indicated schematically at 18, may flow through the fan 22, bypass the remaining components of the engine 20, and exit through a fan nozzle 94. The high energy gas flow 55 is exhausted from the turbine section 32 as an exhaust flow 50 and communicated to a steam generation system 70 and a water recovery system 78 before being exhausted through a core nozzle 96.

The example compressor section 24 includes a low-pressure compressor (LPC) 26 and a high-pressure compressor (HPC) 28. The turbine section 32 includes a high-pressure turbine (HPT) 34, an intermediate pressure turbine (IPT) 36, and a low-pressure turbine (LPT) 38. The turbines 34, 36 and 38 are coupled to a corresponding compressor section. In this disclosed example, the high-pressure turbine 34 is coupled by a high shaft 64 to drive the high-pressure compressor 28. An intermediate shaft 66 couples the intermediate turbine 36 to the low-pressure compressor 26.

A low shaft 68 is coupled to the low-pressure turbine 38 and a gearbox 40 to drive the fan 22. The low shaft 68 may further be coupled to an electric machine 42 that is configured to impart and/or extract power into the low shaft 68. The example gearbox 40 is an epicyclical gear train, such as a planetary gear system, star gear system or other known gear system, with a gear reduction ratio of greater than about 2.3.

Although the example engine 20 is described and shown by way of example as a three-spool engine, other engine configurations, such as two-spool may also benefit from this disclosure and are within the contemplation and scope of this disclosure.

The engine 20 includes a fuel system 52 that includes a liquid hydrogen ($LH_2$) tank 54 in communication with at least one pump 56. The pump 56 drives a fuel flow 45 to the combustor 30. $LH_2$ provides a thermal heat sink that can be utilized to cool various heat loads within the aircraft indicated at 60 and in the engine as indicated at 62, before it becomes the fuel flow 45 to the combustor 30. The heat loads may include, for example and without limitation, super conducting electrics, a working fluid of an environmental control system of the aircraft, an air conditioning heat exchanger, and engine working fluid heat exchangers. Heat accepted into the hydrogen fuel flow increases the overall fuel temperature prior to injection into the combustor 30.

A hydrogen expansion turbine 58 may be provided to extract work from the gas flow 45 prior to injection into the combustor 30. The steam injection system 70 uses exhaust heat from the exhaust gas flow 50 exhausted from the low-pressure turbine 38 to generate a steam flow by evaporating high pressure water through an evaporator 72. The generated steam may then be injected into compressed core airflow at a location 76 for communication into the combustor The steam flow 75 may be also be injected directly into the combustor 30.

Injecting steam into the core airflow 25 prior to the turbine section 32 provides an increased mass flow and power output without requiring additional work by the compressor section 24. In one example embodiment the location for injection of steam 76 is upstream of the combustor 30. Steam flow from the evaporator 72 may be utilized to drive a steam turbine 74 to provide an additional work output prior to injection into the core airflow 25 and the combustor 30.

The water recovery system 78 draws water, schematically indicated at 35, from the condenser 80 and communicates the recovered water to water storage tank 82. The water storage tank 82 operates as an accumulator to provide enough water for operation during various engine operating conditions. A condenser/water separator 80 is provided downstream of the turbine section 32 and the evaporator 72. The condenser/separator 80 is in communication with a cold sink, schematically indicated at 98. The cold sink 98 for the condenser/separator 80 may be, for example, ram or fan air depending on the application and/or engine configuration.

The engine 20 has an increased power output from the injected steam 75 due to an increasing mass flow through the turbine section 32 without a corresponding increase in work from the compressor section 24. An example engine operation cycle may include up to (or more than) 35% steam-airratios (SAR) and may be assisted by a multiple fold (e.g., 2×, 3×, etc.) increase in moisture from burning $H_2$ as the fuel.

The water recovery system 78 includes the water storage tank 82 that receives water from the condenser/water separator 80 and provides for the accumulation of a volume of water required for production of enough amounts of steam. Water recovered from the exhaust gas flow is driven by a low-pressure pump 84 and a high-pressure pump 86 to the evaporator 72.

The example engine 20 further includes an intercooling system, shown schematically at 100. The intercooling system 100 injects and mixes an intercooling water flow 88 with the core airflow 25 to cool and increase the mass of the core airflow 25 through the compressor section 24. Heating and boiling of water injected into the core airflow 25 lowers the temperature of the core airflow 25 and increases the mass flow through subsequent portions of the compressor section 24. Reduced temperatures and increased mass flow provided by injection of water decreases the work required by the compressor section 24.

A cooled cooling air system 102 uses water flow to cool air 90 drawn from the compressor section 24 and communicated to the turbine section 32. The cooling air 90 is used in the turbine section 32 to cool components exposed to the high temperatures of the exhaust gas flow 55. The cooled cooling air system 102 uses a heat exchanger 104 to thermally communicate a portion of a water flow provided by a booster pump 92 with the cool air 90 to further cool the air 90 prior to communication into the turbine section 32.

In this disclosed example embodiment, cooling air 90 is tapped from the high-pressure compressor 28 and communicated to cool the high-pressure turbine 34. As appreciated, cooling air may be tapped from other locations in the compressor section 24 and communicated to cool other portions of the hot side of the engine including the combustor 30 and other turbines within the turbine section 32.

The extraction of water from the exhaust gas flow 50 that provides steam injection into the core airflow 25 to improve engine efficiencies requires monitoring and maintenance to assure operation within predefined operating parameters. Contaminants and/or debris that migrate into the extracted water and steam may affect engine efficiencies. For example, debris and/or contaminants liberated from the water system into components of the propulsion system 20 and/or could build up in the compressor and turbine sections, thereby reducing engine efficiency. Moreover, water condition can provide information utilized to prompt predefined engine maintenance operations. The sources of contaminants and/or debris may include, but are not limited to, environmental and atmospheric contaminants (pollution), debris typical of wear from pumps, and leftover contaminants and/or debris from engine maintenance.

The disclosed example water monitoring system 108 embodiment monitors the condition and content of water and prompts predefined maintenance operations and/or predefined adjustments to engine operation. The condition, content and/or debris within the extracted water can be used to prompt different actions according to predefined criteria.

The disclosed example water monitoring system embodiment 108 includes at least one sensor disposed downstream of the condenser 80. The at least one sensor communicates information indicative of water condition to a controller 110. The controller 110 communicates the received information by way of communication device, such as a display 168 as schematically shown. Additionally, the controller 110 may provide a communication link to an external device configured to receive information indictive of water condition.

In one disclosed example embodiment, a first water condition monitoring sensor (WCMS) 116 is disposed downstream of the condenser 80. The first WCMS 116 may provide information indicative of a chemical composition of the extracted water. It should be appreciated that the first WCMS 116 may operate to gather information regarding water condition using any known water monitoring configuration. For example, the WCMS may gather information regarding conductivity of the extracted water and determine water condition based a predefined parameter corresponding with the sensed conductivity. Information from the first WCMS 116 is communicated to the controller 110 by a communication signal schematically indicated at 134.

The location of the first WCMS 116 is arranged to detect a condition of extracted water immediately downstream of the condenser 80. Additional monitoring locations are disposed throughout the water recovery system 78 and the steam generation system 70 to collect information indicative of water condition and system operation. A second WCMS 112 is disposed after the water storage tank 82 and before the low-pressure pump 84. A third WCMS 114 is disposed downstream of the evaporator 72 to monitor a condition of steam as the steam flow proceeds to the turbine 74 to the combustor 30. A fourth WCMS 118 is provided just upstream of an injection location in the compressor section 24 to monitor a condition of the intercooling water flow 88. A fifth WCMS 120 is disposed downstream from a boost pump 92 that provides water flow to the heat exchanger 104 of the cooled cooling air system 102.

The disclosed locations of the WCMS 112, 114, 116, 118 and 120 are provided by way of example and fewer or additional sensors may be utilized at other locations to provide information regarding water condition in desired locations. Moreover, the criteria for acceptable water conditions at each location of the WCMS 112, 114, 116, 118 and 120 may differ and therefore each of the WCMS 112, 114, 116, 118 and 120 may be configured differently.

Debris liberated from various components of the engine 20 and the water recovery system 78 may turn up in the extracted water flow. The material, size, quantity and timing of debris in the water flow can be indictive of system wear and/or other engine operating conditions and anomalies such as water pump spallation. The disclosed water condition monitoring system 108 includes water debris monitors (WDM) disposed at locations to detect wear of certain devices.

A first WDM 122 is disposed downstream of the low-pressure pump 84 and before water filter 128. Debris in the form of metal fragments in the water flow can be indictive of wear in the pump 84 and are monitored to prompt inspection and condition-based maintenance operations according to a predefined criteria.

A second WDM 124 is disposed downstream of the high-pressure pump 86 and before the evaporator 72. A water filter 125 is disposed downstream of the second WDM 124. The second WDM 124 provides monitoring of the health of the high-pressure pump 86. Moreover, as the evaporator 72 is disposed within the exhaust gas stream, it is exposed to extreme temperatures and pressures. Those temperatures and pressures may wear the evaporator 72. Monitoring for debris with the second WDM 124 prior to the evaporator 72 provides a prompt that can aid in maintaining desired operability of the evaporator 72.

A third WDM 126 is disposed downstream from the booster pump 92 of the cooled cooling air system 102. The third WDM 126 provides, among other possible things, for detecting degradation of the booster pump 92.

The first, second and third WDMs 122, 124 and 126 communicate information to the controller 110 by way of signals that are cumulatively schematically indicated at 136. The format of the signals 136 may be configured as known.

The first, second and third WDM 122, 124 and 126 may operate to detect debris according to known processes. In one disclosed example, the WDMs 122, 124, and 126 may be an inducive coil-based debris monitor. Ferromagnetic or nonferromagnetic metals passing through an inductive coil-based debris monitor will disturb the magnetic fields monitored in the device. This disturbance can be identified as wear particles by controller 110. The quantity, size, and release rate of this debris can be indicative of a pending failure and can be used to prompt inspection and maintenance.

Additionally, a filter may be provided to prevent debris from migrating throughout the entire water recovery and steam injection systems. A filter such as filter 128 can also prevent debris from a failing pump from damaging a downstream pump. In one disclosed example embodiment, a first filter 128 is disposed downstream of the low-pressure pump 84. The first filter 128 may be any type and size that is determined to capture debris of specific size or material. A second filter 125 is disposed downstream of the high-pressure pump 86.

A third filter 130 is disposed downstream of the evaporator 72 to filter out materials that may have migrated into the steam flow 75. The third filter 130 is configured to provide a desired steam flow while preventing migration of debris downstream into the turbine 74 and combustor 30. Additional filters may be disposed at other locations within the engine 20 and are within the scope and contemplation of this disclosure.

A fourth filter 132 is disposed downstream of the booster pump 92 to prevent any debris generated from the booster pump 92 from interfering with operation of the heat exchanger 104 or other portions of the cooled cooling air system 102.

Each of the first filter 128, the second 125, third filter 130 and the fourth filter 132 may include a sensing device that provides an indication of filter health. As the filter gathers debris and becomes clogged, a signal as cumulatively and schematically shown at 138 may be provided to the controller 110. The filter health sensing device may include, but not be limited to, a pressure delta measurement across the filter, or sensing device the measures the thermal properties of the material on the filter to determine wear material type.

The controller 110 is programed to use the provided information and prompt inspection of the corresponding filter according to predefined criteria. The predefined criteria may correspond with engine operating hours and/or an indicated level of clogging. Additionally, a WCMS may be placed after each of the filters 128, 125, 130 and 132 to monitor water flow substantially free of debris.

Figure 2:
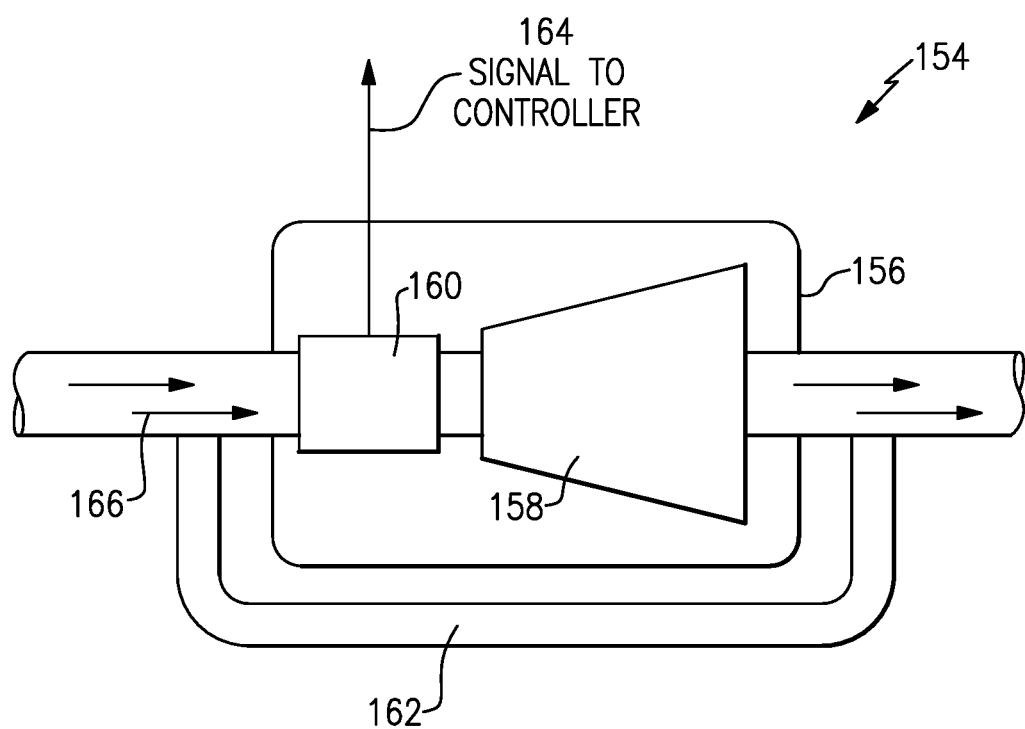
FIG. 2 is schematic view of an example water filter and monitoring assembly embodiment.

Referring to FIG. 2, with continued reference to FIG. 1, an example filter assembly 154 is schematically shown and includes a filter member 158, a sensor 160 and a bypass passage 162. In operation, the filter 158 will stop debris of predetermined size that may be disposed in a water flow 166. Over time, as the filter 158 gathers debris, water flow 166 may become restricted. The sensor 160 provides information by way of a signal 164 to the controller 110 that is indicative of the health and condition of the filter 158. If the restriction of the filter 158 exceeds a predetermined limit, the controller 110 can provide an alert to prompt inspection and maintenance. The bypass passage 162 provides for a continued water flow 166 if the filter 158 restricts water flow to an extent that may affect engine operation. In such an instance, the bypass passage 162 assures a minimum flow of water to maintain engine operation.

Figure 3:
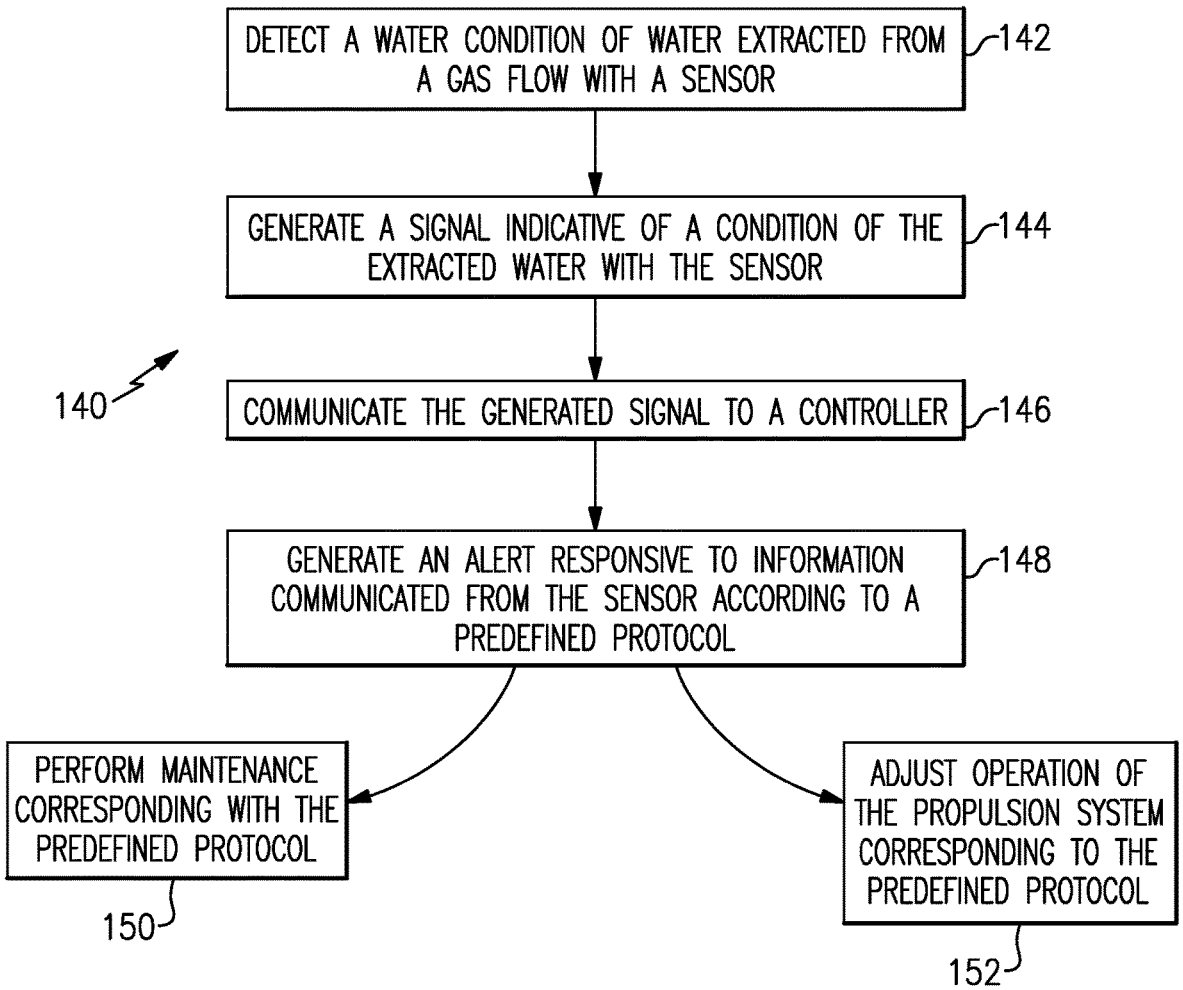
FIG. 3 is a diagram illustrating an example method of monitoring water condition for an aircraft propulsion system.

Referring to FIG. 3, with continued reference to FIG. 1, a disclosed example method of monitoring water condition for an aircraft propulsion system is schematically shown and indicated at 140. The example method includes the step of detecting a water condition of water extracted from a gas flow with at least one sensor as indicated at 142. The sensor may be of any type including the above disclosed examples. The sensor generates a signal that is indicative of a condition of the extracted water as indicated at 144. The controller 110 receives information from the sensors as indicated at 146. The controller 110 generates an alert or prompt in response to the information received from the sensor(s) according to predefined criteria. The predefined criteria can include ranges of acceptable debris, chemical composition, or other criteria of the extracted water that are indicative of parameters that may affect operation.

The controller 110 is programmed to perform an analysis of the gathered information and generate an alert that corresponds with the analysis as indicated at 148. In one disclosed example, the controller 110 is programmed to prompt performance of maintenance operation as indicated at 150. In another disclosed example embodiment, the controller 110 is programmed to prompt adjustment of propulsion system operation according to a predefined protocol as indicated at 152. Adjustment of the propulsion system may include adjustments to improve engine operating efficiency, tailor engine operation to existing water conditions, or change flight operations to compensate for detected changes in water condition. Adjustment of propulsion system operation may be automated and/or may be in the form of information communicated to prompt action by an operator.

The example controller 110 may be part of an engine controller, aircraft controller or any other controller governing operation of the propulsion system and aircraft. The controller 110 may be provided as software instructions stored in a memory device associated with the controller 110. Moreover, the controller 110 may also be provided as separate processor and computing device associated with the disclosed water monitoring system 108. The controller 110 may provide an output by way of the display 168 or other known means including audio devices, and diagnostic devices.

Although an example engine configuration is described by way of example, it will be appreciated that other engine configurations may include additional structures and features and are within the contemplation and scope of this disclosure.

Accordingly, the disclosed water monitoring system senses conditions of water extracted from the gas flow and injected into the core flow to provide information utilized to adjusting engine operation and prompt maintenance operations.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
   a core engine including a core flow path where air is compressed in a compressor section, communicated to a combustor section, mixed with a hydrogen-based fuel and ignited to generate a high energy gas flow that is expanded through a turbine section;
a hydrogen fuel system configured to supply hydrogen fuel to the combustor through a fuel flow path;
a water recovery system including a condenser arranged along the core flow path that is configured to extract water from the high energy gas flow;
a water monitoring system including at least one sensor disposed downstream of the condenser and a controller programed to determine a condition of water and generate a prompt based on information communicated from the at least one sensor; and
an evaporator in thermal communication with a core engine heat source and configured to generate a steam flow from a portion of water extracted by the condenser, wherein the steam flow is injected into the core flow path upstream of the turbine section.

2. The propulsion system as recited in claim 1, including a water storage tank receiving water extracted by the condenser and at least one pump in fluid communication with the water storage tank.

3. The propulsion system as recited in claim 2, wherein the at least one sensor comprises a water debris monitor disposed downstream of the at least one pump, the water debris monitor is in communication with the controller.

4. The propulsion system as recited in claim 3, wherein the water debris monitor comprises an inductive coil based debris monitor that detects magnetic field disturbances from a passing ferrous or nonferrous metal.

5. The propulsion system as recited in claim 2, wherein the at least one sensor comprises a water condition monitoring sensor disposed downstream of the condenser, the water condition monitoring sensor is in communication with the controller.

6. The propulsion system as recited in claim 5, wherein the water condition monitoring sensor comprises a conductivity monitor that detects contaminants within the water based on a change in measured conductivity.

7. The propulsion system as recited in claim 5, wherein the water condition monitoring sensor comprises a chemical species sensor with real-time chemical analysis of water to assess water condition.

8. The propulsion system as recited in claim 2, including at least one water filter and filter monitor disposed downstream of the at least one pump, the at least one filter monitor in communication with the controller.

9. The propulsion system as recited in claim 8, including a bypass passage for bypassing flow around the at least one filter.

10. The propulsion system as recited in claim 8, wherein the at least one water filter and the at least one filter monitor comprises a common assembly within a common housing.

11. The propulsion system as recited in claim 8, wherein the at least one water filter and filter monitor comprises a first water filter and filter monitor disposed downstream of the evaporator.

12. The propulsion system as recited in claim 1, wherein the prompt comprises a maintenance prompt prompting performance of a predefined maintenance operation.

13. The propulsion system as recited in claim 1, wherein the prompt comprises an engine performance prompt prompting a predefined engine operating procedure.

14. A water recovery system for an aircraft propulsion system, the water recover system comprising:
a condenser configured to extract water from an exhaust gas flow;
at least one sensor disposed downstream of the condenser;
a controller programed to determine a condition of water extracted by the condenser and generate an alert based on information communicated from the at least one sensor; and
an evaporator in thermal communication with a heat source and configured to generate a steam flow from a portion of water extracted by the condenser, wherein the steam flow is injected into a core flow path upstream of a turbine section.

15. The water recovery system as recited in claim 14, wherein the alert comprises a maintenance alert prompting performance of a predefined maintenance operation.

16. The water recovery system as recited in claim 14, wherein the alert comprises an engine performance alert prompting a predefined engine operating procedure.

17. A method of monitoring water condition for an aircraft propulsion system, the method comprising:
detecting a water condition with a sensor located downstream of a condenser arranged along a core flow path for extracting water from a high energy gas flow;
generating a signal indicative of a condition of the extracted water with the sensor;
communicating the generated signal to a controller; and
generating an alert based on the information communicated from the sensor with the controller to prompt a predefined action; and
generating a steam flow from a portion of the extracted water, sensing a condition of the steam flow with a monitoring device and communicating the sensed condition to the controller.

18. The method as recited in claim 17, wherein the predefined action comprises one of a predefined maintenance operation or an adjustment to operation of the aircraft propulsion system.

19. The method as recited in claim 18, wherein the sensor comprises at least one of a water condition monitor sensor, a debris sensor and a filter operation monitor sensor.

* * * * *